3,400,136
METHOD FOR PREPARING 6,6-ETHYLENE
STEROIDS
Kenneth G. Holden, Stratford, N.J., assignor to Smith
Kline & French Laboratories, Philadelphia, Pa., a corporation of Pennsylvania
No Drawing. Filed Nov. 24, 1965, Ser. No. 509,623
10 Claims. (Cl. 260—397.4)

This invention relates to new and improved processes for preparing biologically active steroids containing the 3-keto-$\Delta^{4,5}$-6,6-ethylene system.

The 6,6-ethylene or spirocyclopropyl steroid compounds produced by these processes have potent, often enhanced, pharmacodynamic activity compared with their respective parent compounds. For example, the 6,6-ethylene testosterones have potent anabolic-androgenic activity, the 6,6-ethylenepregnenes, i.e. 6,6-ethyleneprogesterone, have progestational activity; the 6,6-ethylenecorticoids, i.e., 6,6-ethylenehydrocortisone or cortisone, have anti-inflammatory activity and the 6,6-ethylene-B-nor-testosterones have anti-androgenic activity.

The reactions of this invention are applicable to any steroid possessing the necessary 3-lower alkoxy-3,5-diene structure (I below), but of course having no chemically interfering groups. Exceptions will be apparent to those skilled in the art. If there are such interfering groups they should be protected as known to those skilled in the art, such as by converting hydroxy groups to their ester or ether derivatives even though steroids containing hydroxy groups at certain positions can be used in this reaction. The reactions claimed are most advantageously run under very mild conditions making their applicability very wide.

The overall process of this invention is illustrated by the following:

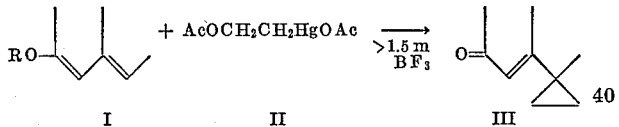

Previously I had found that β-acyloxyethylmercuric acylates could be condensed with 3-alkoxysteroidal-3,5-dienes in the presence of certain catalysts of the Lewis acid type especially boron trifluoride to form a 6-acyloxyethyl intermediate which in a distinct second step is cyclized to the desired 6,6-ethylene steroid.

I have now discovered that if substantially equimolar amounts or less of the catalyst are used as I previously described, the major product isolated from the reaction mixture is indeed the 6-β-acyloxyethyl intermediate. This intermediate must then be hydrolyzed and cyclized to give the desired 6,6-ethylene-3-keto-$\Delta^{4,5}$-steroid. I have further unexpectedly found that when a substantial excess of the catalyst is used, the major product is the desired 6,6-ethylene derivative (III) without a discrete second chemical step. By a substantial excess of Lewis acid catalyst, the use of over 1.5 mole equivalent amounts is most practical. In practice about 2 mole equivalents of boron trifluoride or its etherate complex are used. When 0.25 mole of catalyst are used, substantially no cyclic end product is isolated.

This unexpected discovery, therefore, eliminates subsequent steps of the reaction but gives at the same time substantial yields of the desired product. At present the exact mechanism of the claimed reaction is unclear. At times even larger excess of catalyst than the preferred amounts described above are used along with an excess of the mercury reagent to give excellent yields.

The reaction conditions except for the mole ratio of catalyst are approximately those described in my previous application, Ser. No. 465,788 filed June 21, 1965, now abandoned. The process uses as a starting material a 3-lower alkoxy-3,5-diene of Formula I in which R is a lower alkyl of a maximum of 6 carbons, preferably methyl or ethyl. These compounds are either known to the art or are prepared by similar reactions a detailed example of which is presented hereafter.

The diene (I) is condensed with a β-acyloxyethylmercuric acylate [see K. Ichikawa et al., J. Am. Chem. Soc., 81:5316 (1959)]. The acyl groups (Ac) of the mercury reagent may be derived from any lower carboxylic acid of a maximum of 10 carbon atoms but the most convenient group to use is acetyl ($CH_3CO-$). Lower alkyl groups such as methyl may optionally be substituted on the ethyl portion of the mercury reagent. The unsubstituted ethyl reagent cyclizes most smoothly and is preferred.

The reaction is carried out conveniently in a non-protonic organic solvent in which the reactants are soluble and which is inert under the reaction conditions, such as a lower ether or preferably a halogenated lower alkane solvent, such as methylene chloride, chloroform, ethylene chloride, etc. An excess of catalyst for the reaction is used for example over 1.5 mole equivalents of a Lewis acid, for example aluminum chloride, ferric chloride, zinc chloride, stannic chloride, or preferably boron trifluoride most conveniently as its etherate. Protonic acids such as perchloric or p-toluenesulfonic acid have proved ineffective as catalysts. The only reaction observed with such acids is conversion of the methoxydiene back to the 3-keto-$\Delta^{4,5}$ structure. The reaction may be carried out over a range of temperatures and duration of reaction but most conveniently is run at from about 0° C. to about room temperature, preferably 0–5° C., for up to about five to seven days to give the desired spirocyclopropyl steroid (III). This reaction is most conveniently carried out at 0° C. for up to one hour.

When the reaction is carried out as described the product may be contaminated by a proportion of the uncondensed 3-keto-$\Delta^{4,5}$ starting material. I have found that a simple method of separating the desired cyclic product from this material is to react the mother liquor of the reaction mixture with a secondary amine preferably pyrrolidine or piperidine to form the enamine derivative of the uncondensed 3-keto-$\Delta^{4,5}$ parent compound. This separated derivative is removed to leave the desired 6,6-ethylene-3-keto-$\Delta^{4,5}$-steroid. This separation does not apply to the 19-norsteroids.

The reaction of this invention is particularly applicable to compounds having a pregnane or androstane nucleus such as in the following compounds:

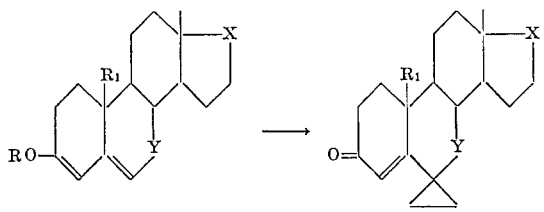

in which:

R is a lower alkyl of a maximum of 6 carbon atoms such as methyl or ethyl;

$R_1$ is methyl, hydrogen or substituted methyl, such as acetoxymethyl;

Y is a single carbon-carbon bond (the B-nor series) or methylene (the normal series); and

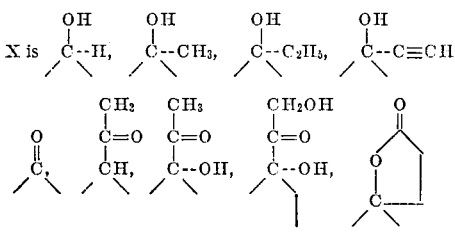

or O-acetyl derivatives thereof. These compounds may also have other conventional nuclear substitutents in the C and D rings, such as optional oxo or hydroxymethylene ring members at position 11α, 9α-fluoro or 16-methyl or hydroxy ring substituents.

The following examples will illustrate this invention further but are not intended to limit the scope of same.

EXAMPLE 1

A solution of 30 g. of 17α-methyl-B-nortestosterone in 100 ml. of acetic anhydride is heated at reflux for three hours. The acetic anhydride is removed by evaporation at reduced pressure. The residue is dissolved in toluene and again evaporated to remove traces of acetic anhydride. The crystalline residue of 17α-methyl-B-nor-testosterone acetate is dissolved in 100 ml. of trimethyl orthoformate containing 0.3 g. of p-toluenesulfonic acid and the resulting solution is refluxed for twelve hours. The cooled reaction mixture is quenched with pyridine, poured into dilute sodium carbonate solution and extracted with methylene chloride. Evaporation of the dried methylene chloride extract gives an oily residue which is crystallized from 100 ml. of petroleum ether. Filtration gives crystalline 17α-methyl-B-nor-testosterone acetate, M.P. 135–137° C. The petroleum ether filtrate is filtered through 250 g. of activity I Woelm alumina and the column is washed with 1250 ml. of petroleum ether. Evaporation of the total filtrate gives 17β-acetoxy-3-methoxy-17α-methyl-B-norandrosta-3,5-diene, M.P. 103–110° C., after recrystallization from methanol-water containing a little pyridine.

This intermediate is a new compound and an important part of this invention.

A mixture of 1.00 g. (0.0029 mole) of the 3-methoxydiene, 2.08 g. (0.0058 mole) of β-acetoxyethylmercuric acetate and 10 ml. of methylene chloride is stirred at 0° C. while 0.73 ml. (0.0058 mole) of boron trifluoride etherate is added. After stirring at 0° C. for one hour, 2.5 ml. of water is added followed by 2.5 ml. of pyridine. Following dilution with methylene chloride, the organic layer is separated from the mercury, washed with dilute alkali, dried and concentrated to a brown oil. The oil in benzene solution is filtered through 10 g. of Woelm neutral alumina, activity III. Concentration gives a brown gum which is dissolved in 10 ml. of hot methanol then mixed with 2 ml. of pyrrolidine. After 45 minutes at room temperature, the solution is concentrated in vacuo. The residue is taken up in methylene chloride. The organic solution is washed with cold 20% acetic acid solution followed by cold 5% sodium carbonate solution. Evaporation of the dried methylene chloride phase gives a yellow residue which is purified by dissolving in 11 ml. of 1:1 benzene-petroleum ether and passing over a column of neutral alumina. The fractions eluted with 1:1-benzene-petroleum ether, 2:1 benzene-petroleum ether and benzene are combined and evaporated to give 6,6-ethylene-17α-methyl-B-nor-testosterone acetate from diethyl ether, M.P. 156.5–163.5° C.

Hydrolysis of the 17-acetate with sodium hydroxide gives 6,6-ethylene-17α-methyl-B-nor-testosterone, M.P. 186.5–189.5° C., a potent anti-androgenic agent.

EXAMPLE 2

A mixture of 26.0 g. of 17β-acetoxy-3-methoxy-19-nor-androsta-3,5-diene (M.P. 149–154° C.) and 53.8 g. of β-acetoxyethylmercuric acetate in 260 ml. of methylene chloride is stirred at 0° C. while 19.6 g. of boron trifluoride etherate is added over three minutes. After stirring for thirty minutes, water is added and the stirring continued for ten minutes. Pyridine is added followed by methylene chloride. The decanted organic layer is washed with alkali, dried and evaporated to give, after alumina purification as described, 6,6-ethylene-19-nor-testosterone-17-acetate. The acetate is dissolved in 150 ml. of methyl alcohol and 70 ml. of 5% sodium carbonate solution then heated at reflux for two hours. Concentration and extraction into methylene chloride gives 6,6-ethylene-19-nor-testosterone, M.P. 138° C., after purification as described. This compound is a potent anabolic-androgenic agent.

EXAMPLE 3

A mixture of 0.8 g. of 17β-acetoxy-3-methoxyandrosta-3,5-diene [Tetrahedron, 20:597 (1964)], 1.4 ml. of β-acetoxyethylmercuric acetate, 1.0 ml. of boron trifluoride etherate in 8 ml. of methylene chloride is reacted at 0° C. for two hours. The reaction mixture is purified by a silica gel column, an alumina column and via eneamine formation with pyrrolidine as described in Example 1 to give first the acetate and then 6,6-ethylenetestosterone, a potent anabolic-androgenic compound, M.P. 220–221° C.

EXAMPLE 4

A solution of 1.0 g. of 17β-hydroxy-3-methoxyandrosta-2,5-diene-17α-propionic acid γ-lactone [prepared from the 3-keto-$\Delta^{4,5}$ congener, J. Org. Chem. 25, 96 (1965) with trimethylorthoformate], 1.94 g. of β-acetoxy ethyl mercuric acetate, 0.98 ml. of boron trifluoride etherate and 10 ml. of methylene chloride are reacted at 0° C. for thirty-five minutes. The reaction mixture is worked up as in Example 1 with an alumina column, eneamine formation with pyrrolidine and recrystallization from ether solution to give 17β-hydroxy-3-oxo-6,6-ethyleneandrost-4-ene-17α-propionic acid γ-lactone, M.P. 161–163° C., having androgenic-anabolic activity.

EXAMPLE 5

To a solution of 43.6 g. of 3β,19-diacetoxyandrost-5-en-17-one [see J. Kalvoda et al., Helv. Chim. Acta., 46, 1361 (1963)] in 300 ml. of chloroform is added 25.8 g. of m-chloroperbenzoic acid in 150 ml. of chloroform at 25–30° C. The reaction mixture is allowed to stand for three hours and is washed with aqueous sodium sulfite and aqueous sodium carbonate solution. Drying and evaporation of the chloroform phase gives 3β,19-diacetoxy-5,6-epoxyandrostan-17-one, M.P. 128–129° C.

To a stirred solution of 42 g. of 3β,19-diacetoxy-5,6-epoxyandrostan-17-one in 1200 ml. of methylethylketone is added aqueous chromic acid (50 g. of chromium trioxide in 100 ml. of water) so that the temperature does not exceed 40° C. The reaction mixture is then maintained at 40° C. for one hour and is poured into 2500 ml.

of water. Extraction with methylene chloride gives crude 3β,19-diacetoxy-5α-hydroxyandrostan-6,17-dione.

To a solution of 42 g. of the crude dione in 200 ml. of chloroform is added 50 g. of m-chloroperbenzoic acid in 350 ml. of chloroform below 30° C. After stirring at room temperature for 24 hours the reaction mixture is washed with 10% aqueous sodium sulfite solution and 5% aqueous sodium bicarbonate solution. The sodium bicarbonate phase is acidified with phosphoric acid and extracted with cholorform to give a mixture of m-chlorobenzoic acid and 3β,19-diacetoxy - 5,17 - dioxo-5,6-secoandrostan-6-oic acid.

This mixture is dissolved in 150 ml. of pyridine and treated with 50 ml. of benzoyl chloride with cooling. After standing for 24 hours at room temperature the reaction mixture is poured into 1500 ml. of water and extracted with methylene chloride. After washing, drying and evaporating the methylene chloride extracts the residue therefrom is crystallized from ether to give 3β,19-diacetoxy-5β-hydroxy-17-oxo-B-norandrostan-6-oic acid 5,6-lactone, M.P. 170° C. (dec.).

The 5,6-lactone (20.7 g.) is heated at 200–205° C. for 10–12 minutes or until the evolution of gas has stopped. The crude product is dissolved in 200 ml. of dry tetrahydrofuran and a solution of 248 ml. of 2 M methyl magnesium bromide in tetrahydrofuran-benzene is added dropwise over one hour. The solution is heated at reflux for two hours and allowed to stand overnight. Ammonium chloride solution, then iced diluted hydrochloric acid is used to hydrolyze the complex. The product is extracted into ethyl acetate to give crude 3β,17β,19-trihydroxy-17α-methyl-B-nor-androst-5-ene which is recrystallized from ethyl acetate to give a M.P. 200–202° C.

A mixture of 10.2 g. of the trihydroxy compound, 52 ml. cyclohexanone and 310 ml. toluene is azeotroped until 250 ml. distillate has been collected. Then 3.7 g. of finely ground aluminum isopropoxide is added and heating is continued for 40–45 minutes with a slow distillation. The reaction is quenched with 4 ml. of water, the solids are filtered and leached with 3:1 ethyl acetate-methanol. The filtrates are concentrated to 100 ml., cooled and the product filtered giving 17β,19-dihydroxy-17α-methyl-B-norandrost-4-ene-3-one, M.P. 198–200° C.

A solution of 19.6 g. of the dihydroxy compound in 100 ml. of acetic anhydride is heated at reflux for one hour. The solvent is evaporated under reduced pressure, and the residue is diluted with 10 ml. of 80% alcohol, warmed for 5 minutes, diluted with benzene and washed with dilute sodium carbonate solution. Evaporation of the dried benzene phase gives 19-hydroxy-17α-methyl-B-nor-testosterone 17,19-diacetate.

A solution of 21.0 g. of the diacetate in 75 ml. of trimethyl orthoformate and 50 ml. of benzene containing 0.2 g. of p-toluenesulfonic acid is slowly distilled during six hours so that the reaction mixture is concentrated to about half its original volume. It is cooled, quenched with pyridine, diluted with water and extracted with methylene chloride. The methylene chloride extracts are washed with sodium carbonate solution, dried and evaporated to a residue which is purified by column chromatography over 200 g. of alumina (Woelm, activity III). The product, 17β,19-dihydroxy - 3 - methoxy-17α-methyl-B-nor-androsta-3,5-diene 17,19-diacetate, is eluted with petroleum ether and petroleum ether-benzene (1:1).

A solution of 11.5 g. of 17β,19-dihydroxy-3-methoxy-17α-methyl-B-nor-androsta-3,5-diene 17,19 - diacetate and 23.0 g. of β-acetoxyethylmercuric acetate in 150 ml. of dry methylene chloride is stirred at 0° C. under nitrogen and treated with 7.5 ml. of boron trifluoride etherate. After one hour at 0° C. 25 ml. of water is aded. After an additional 10 minutes the reaction mixture is quenched with 25 ml. of pyridine, decanted from precipitated mercury, washed with dilute sodium carbonate solution, dried, and evaporated to a residue. The residue is dissolved in 100 ml. of benzene and filtered through 100 g. of alumina (Woelm, activity III). The alumina is washed with 500 ml. of benzene and the combined benzene filtrates are evaporated. The residue is dissolved in 50 ml. of hot methanol and treated with 10 ml. of pyrrolidine. After cooling to room temperature during 45 minutes, the reaction mixture is evaporated at reduced pressure. The residue is dissolved in methylene chloride, washed with cold 20% aqueous acetic acid and sodium carbonate solutions, dried and evaporated to give 6,6-ethylene-19-hydroxy-17α-methyl - B - nor - testosterone 17,19 - diacetate which is purified by chromatography on alumina (Woelm, activity III). This compound is an important intermediate for preparing biologically active end products such as by the following process.

A solution of 4.3 g. of 6,6-ethylene-19-hydroxy-17α-methyl-B-nor-testosterone 17,19-diacetate in 250 ml. of methanol containing 50 ml. of 10% aqueous sodium hydroxide is heated at reflux under nitrogen for 8 hours. The reaction mixture is concentrated and cooled and the precipitate of 6,6 - ethylene-19-hydroxy-17α-methyl-B-nor-testosterone is collected by filtration.

A solution of 2.8 g. of 6,6-ethylene-19-hydroxy-17α-methyl-B-nor-testosterone in 30 ml. of acetone is treated with excess chromic acid (4 equivalents/l. in sulfuric acid-water) at 0° C. with stirring. After 15 minutes the reaction mixture is diluted with water and extracted with ethyl acetate. The dried ethyl acetate extracts are evaporated to a residue of 6,6 - ethylene - 17β - hydroxy - 17α-methyl-3-oxo-B-nor-androst-4-en-19-oic acid.

A solution of 2.5 g. of the acid in 50 ml. of pyridine is heated at reflux for one hour. Evaporation of the solvent at reduced pressure gives a residue which is dissolved in 100 ml. of methanol and treated with 0.5 g. of sodium methoxide under nitrogen at room temperature. After one hour the reaction mixture is diluted with 50 ml. of water, concentrated and cooled. The precipitate of 6,6-ethylene-17α-methyl-19-nor-B-nor - testosterone is collected by filtration. This compound has potent anti-androgenic activity.

EXAMPLE 6

Using the procedure of Example 1 but using 17α-acetoxy-3-methoxypregna-3,5 - dien-20-one [Tetrahedron, 20:597 (1964)], with 2 moles of β-acetoxyethylmercuric acetate and 5 moles of boron trifluoride gives 6,6- ethylene-17α-acetoxy progesterone, M.P. 213–215° C., a potent progestational compound. Using the 3-methoxy-17β-hydroxyandrosta-3,5-diene benzoate gives 6,6-ethylene testosterone benzoate, M.P. 165–167° C. 3-methoxy-17α-methylpregna-3,5-dien-20-one [Tetrahedron, 20:357 (1964)] gives 6,6-ethylene-17α-methylprogesterone, 3-methoxy-16α-methylpregna-3,5-dien-20-one (U.S. Patent No. 3,114,750) gives 6,6-ethylene-16α-methylprogesterone. 3-methoxy-pregna-3,5-diene-20-one gives 6,6-ethyleneprogesterone.

What is claimed is:
1. The method of preparing 6,6-ethylene-3-keto-Δ$^{4,5}$-steroids comprising reacting a 3-methoxy or ethoxy-3,5-diene steroid with β-acetoxy-ethylmercuric acetate in the presence of an excess of a Lewis acid catalyst.

2. The method of claim 1 characterized in that the Lewis acid catalyst is boron trifluoride or boron trifluoride or boron trifluoride etherate.

3. The method of claim 1 characterized in that the steroid has a pregnane or androstane nucleus and the catalyst is boron trifluoride.

4. The method of claim 3 characterized in that 1.5 or more moles of catalyst are present.

5. The method of claim 3 characterized in that the reaction is carried out at from about 0° C. to room temperature.

6. The method of claim 1 characterized in that the 6,6-ethylene-3-keto-Δ$^{4,5}$-steroid is separated from the unreacted 3-keto-Δ$^{4,5}$-steroid by forming an eneamine derivative of the latter.

7. The method of claim 1 characterized in that the 3- methoxy-3,5-diene steroid is 3-methoxy-17β-acetoxy-19-nor-androsta-3,5-diene and the product is 6,6-ethylene-19-nor-testosterone acetate.

8. The method of claim 1 characterized in that the 3-methoxy-3,5-diene steroid is 3-methoxy-17β-acetoxy-17α-methyl-B-nor-androsta-3,5-diene and the product is 6,6-ethylene-17α-methyl-B-nor-testosterone acetate.

9. The method of claim 1 in which the Lewis acid catalyst is boron trifluoride in from about 1.5–2.5 moles.

10. 3 - methoxy or ethoxy - 17β-acetoxy-17α-methyl-B-nor-androsta-3,5-diene.

References Cited

UNITED STATES PATENTS 3,261,829  7/1966  Colton et al. _____ 260—239.5

LEWIS GOTTS, *Primary Examiner.*

E. G. LOVE, *Assistant Examiner.*